C. W. GLOVER.
Self Raker.
No. 22,117. Patented Nov. 23, 1858.
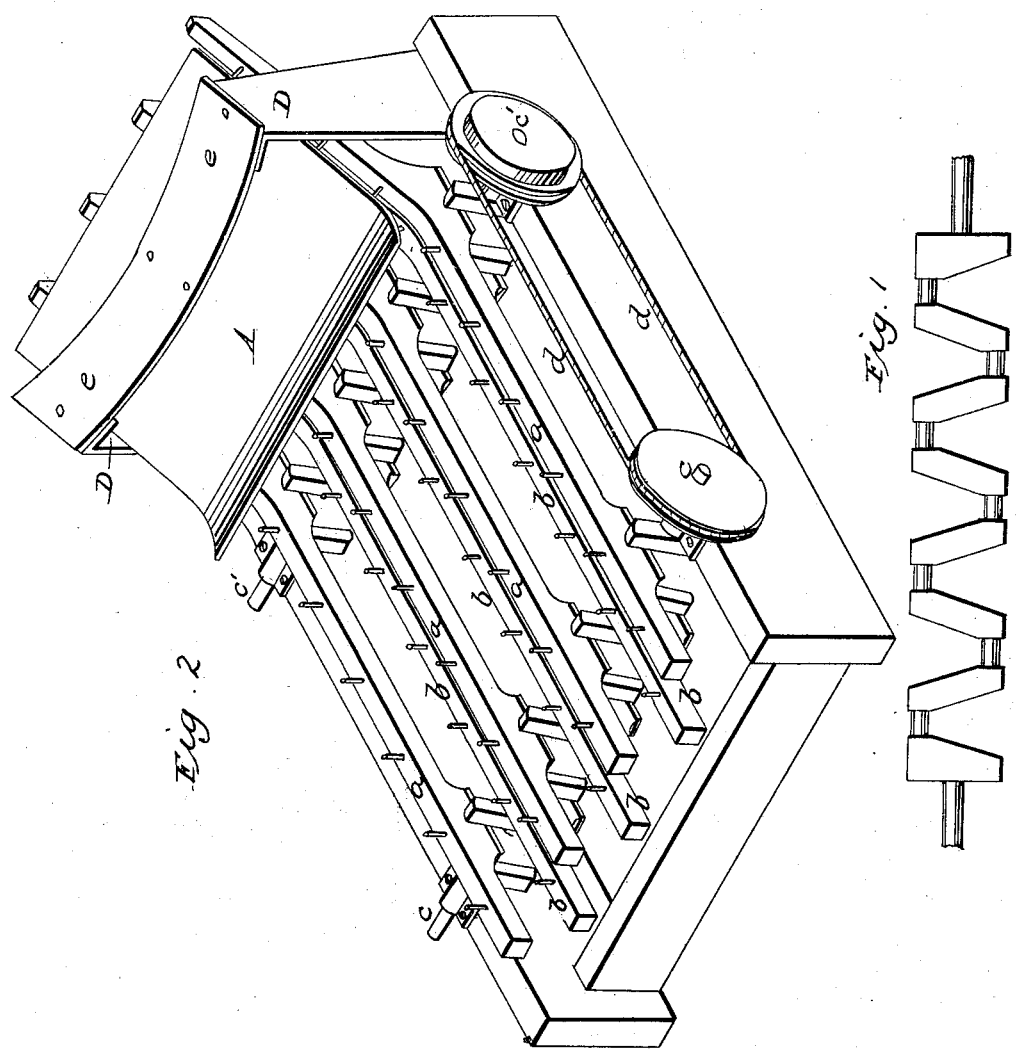
Attest:
Thos. Orton
Inventor:
Carlos W. Glover

UNITED STATES PATENT OFFICE.

CARLOS W. GLOVER, OF FARM RIDGE, ILLINOIS.

IMPROVEMENT IN STRAW-CARRIERS.

Specification forming part of Letters Patent No. 22,117, dated November 23, 1858.

*To all whom it may concern:*

Be it known that I, CARLOS W. GLOVER, of Farm Ridge, in the county of La Salle and State of Illinois, have invented a new and useful machine for raking, elevating, or conveying the stalks, grass, or straw of any agricultural product, whether the same have been thrashed or not; and I do hereby declare that the following is a full, clear, and exact description of the construction and operation of the same, reference being had to the annexed drawings, making a part of this specification, and of which—

Figure 1 is a view of the crank-shafts referred to in this specification; and Fig. 2 is a perspective view of the entire machine, although it may be indefinitely extended horizontally, vertically, or on any inclination, according to the course and distance of conveyance desired.

My invention consists in combining with a series of vertically and horizontally moving bars for carrying forward and upward the stalks, the spring guide and holder to prevent said stalks in their greatest ascent from slipping back or getting entangled.

To enable others skilled in the art to make and use my invention, I will proceed to describe the same with reference to the drawings.

B represents a frame or bed, in which are hung two crank-shafts, one of which is shown in Fig. 1, the journals $c\ c'$ of which are seen in Fig. 2. Pulleys C C are arranged on these respective journals, around which an endless belt or band, $d$, may pass, so as to give both of the shafts motion and prevent one from hanging or dragging on the other.

Around one of the pulleys a belt from any first mover may pass to give it motion, and which it communicates to the other pulley through the belt $d$.

To the series of cranks $f\ f$, &c., on these crank-shafts are connected the series of bars $a\ a$, and to the other series of cranks, $g\ g$, &c., are similarly connected the series of bars $b\ b$, both sets of bars being provided with spikes or teeth.

It is obvious that the revolving of the two crank-shafts will give an alternating vertical and horizontal motion to these bars $a\ b$, and that they will take the stalks or straws from each other and carry them in the direction of the rotation of the shafts.

So far as the carrying of grain or straw on a level, or even an inclined plane, by bars having the motions herein described, is concerned, no novelty is alleged; but to carry up the stalks on an inclined plane and keep them straight and even, and prevent their slipping back and entangling, involves invention. To accomplish this I use the following means:

A is a shield, lying very near the highest plane of the spikes or pins in the bars $a\ b$, and this shield is held in place by a spring, $e\ e$, so that while the shield will prevent the stalks under it from dropping back or leaving their position on the teeth or spikes, yet when it is necessary to save the conveyer from being damaged by the clogging or choking underneath the shield will rise (the spring admitting of this) and allow the excess to pass through. This shield is curved up at its lower end to allow the stalks to freely pass under it; and it is attached to the spring $e$ at about the center of each, so that the shield may move away entirely from the conveyer, or only one end of it, should occasion so require, the spring being suitably curved to admit of this end movement.

The bars are shaped like that shown in the front of Fig. 2, and the apparatus may be connected with any machine from which grain or stalks are to be taken and elevated.

D are the supports for holding the spring $e$ and the shield A that is connected to it.

Having thus fully described the nature and object of my invention, what I claim therein as new, and desire to secure by Letters Patent, is—

In combination with a series of bars, $a\ b$, having the motions herein described, the spring-shield for aiding to guide the stalks or other thing conveyed thereon, and for preventing their falling back or becoming entangled, substantially as herein set forth.

CARLOS W. GLOVER.

Witnesses:
  A. G. FISHER,
  THOS. ORTON.